May 13, 1969     E. J. DEY     3,443,616

CASTELLATED NUT

Filed July 26, 1967

INVENTOR.
ERVIN J. DEY

BY *Andrew L. Yey*

ATTORNEY

United States Patent Office 3,443,616
Patented May 13, 1969

---

3,443,616
CASTELLATED NUT
Ervin J. Dey, Santa Fe Springs, Calif., assignor to Standard Pressed Steel Co., Jenkintown, Pa., a corporation of Pennsylvania
Filed July 26, 1967, Ser. No. 656,256
Int. Cl. F16b *39/28, 39/02, 39/00*
U.S. Cl. 151—21    2 Claims

ABSTRACT OF THE DISCLOSURE

A castellated nut having an inner tapped barrel surrounded by a concentric sleeve. The sleeve has radial slots adapted to receive a pin or other security device. The tapped barrel may be elliptically deformed to render the nut self-locking.

---

The present invention relates, in general, to fasteners and, in particular, to a castellated nut form which is particularly suited for use in self-locking nuts.

Most conventional castellated nuts rely solely on a pin, safety wire or other keyed security device to insure the security of a bolted assembly. On occasion, the pin is not installed or if installed, fails and thereafter vibration can cause loosening of the nut. Certain castellated nuts have been provided with non-metallic locking inserts on the nut threads to provide a second degree of reliability against the nut coming loose when subjected to vibration. The nature and characteristics of many of the locking inserts prevent their use at elevated temperatures. In addition, nuts provided with these inserts have limited reusability.

Accordingly, it is an object of the present invention to provide a new and improved castellated nut.

It is another object of the present invention to provide a castellated nut having a self-locking feature.

It is a further object of the present invention to provide a castellated nut which is relatively simple in construction and inexpensive to fabricate.

It is yet another object of the present invention to provide a self-locking castellated nut which is not subject to the shortcomings and limitations of comparable, presently available, devices which serve the same purpose.

Briefly stated, a castellated nut constructed in accordance with the present invention has an inner tapped portion, an outer portion concentrically surrounding the inner tapped portion, and a web joining the inner tapped portion and the outer portion together. The outer portion is provided with a plurality of radial slots extending from a free edge thereof toward the web.

For a better understanding of the present invention, together with other and further objects thereof, reference is made to the following description, taken in connection with the accompanying drawing, and its scope will be pointed out in the appended claim.

Referring to the drawing.

Figure 1:
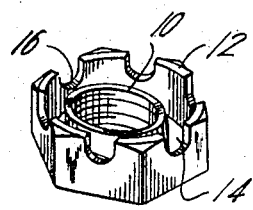
FIGURE 1 is a perspective view of a first embodiment of a castellated nut constructed in accordance with the present invention.
Figure 2:
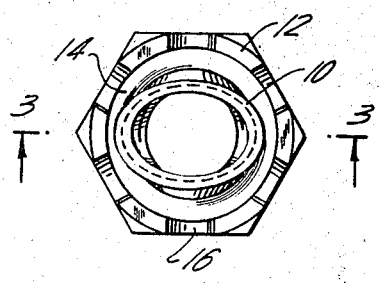
FIGURE 2 is a plan view of the castellated nut illustrated in FIGURE 1.
Figure 3:
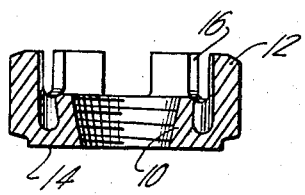
FIGURE 3 is a vertical section taken along line 3—3 of FIGURE 2.

Referring to FIGURES 1, 2, and 3, a castellated nut constructed in accordance with the present invention has a tapped barrel 10, an outer sleeve 12 concentrically surrounding the tapped barrel and a web 14 joining the tapped barrel and the outer sleeve together. The outer surface of sleeve 12, although shown as being hexagonal, may be of any configuration suitable for turning the nut onto a mating threaded fastener. As most clearly illustrated in the sectional view of FIGURE 3, outer sleeve 12 has a greater height than tapped barrel 10.

The outer sleeve is provided with a plurality of radial slots 16 extending from the free edge of the outer sleeve toward web 14. Slots 16 are positioned along diameters of the nut. These radial slots are adapted to receive a pin or similar security device which is passed through a diametral hole in a male fastener onto which the nut is turned.

As most clearly illustrated in the plan view of FIGURE 2, the tapped barrel 10 is deformed so as to have an elliptical cross-section which serves to lock the nut on a male fastener onto which the nut has been turned. By providing a tapped barrel separate from the slotted outer sleeve, the barrel may be elliptically deformed very easily. As a result, this castellated nut provides the same degree of safety as other self-locking nuts if a pin is not installed through the slots in the sleeve and a mating male fastener. When a pin is employed with this nut, two degrees of reliability are provided.

Figure 4:
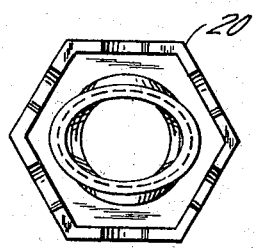
FIGURE 4 is a plan view of a second embodiment of a castellated nut constructed in accordance with the present invention.

FIGURE 4 is a plan view of a second embodiment of a castellated nut constructed in accordance with the present invention. The second embodiment differs from the one described in connection with FIGURES 1, 2, and 3 in that in FIGURE 4 the inside surface of the outer sleeve 20 is hexagonal, while for the embodiment shown in FIGURES 1, 2, and 3, the inside surface of the outer sleeve is circular. This difference is due to the methods employed in the fabrication of the nuts. The nut described in connection with FIGURES 1, 2, and 3 is formed from solid hexagonal stock. Screw machine techniques are employed in drilling and tapping the hole in barrel 10, cutting the groove between barrel 10 and sleeve 12, and cutting radial slots 16. Selected lengths of the machined stock are cut off to form the desired nut product.

The nut shown in FIGURE 4 is formed from sheet metal. The sheet stock is subjected to progressive dies followed by hexagonal forming of the outer sleeve.

Figure 5:
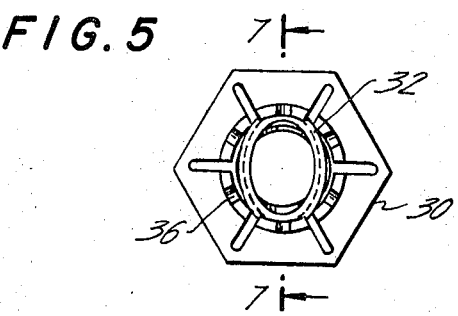
FIGURE 5 is a plan view of a third embodiment of a castellated nut constructed in accordance with the present invention.
Figure 7:
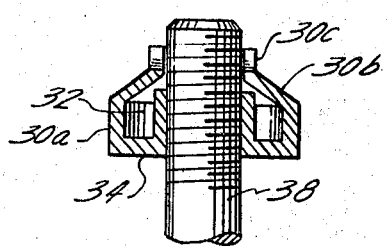
FIGURE 7 is a vertical section taken along line 7—7 of FIGURE 5.
Figure 6:
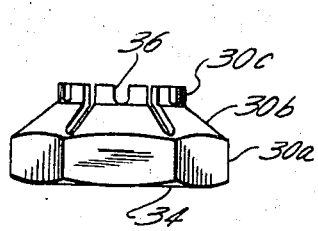
FIGURE 6 is an elevation view of the castellated nut illustrated in FIGURE 5.

FIGURES 5, 6, and 7 are various views illustrating a third embodiment of a castellated nut constructed in accordance with the present invention. This embodiment differs from the two previously described in that the outer sleeve 30 is bent inward toward the tapped barrel 32. In particular, the outer sleeve 30 has a first vertical section 30a extending upward from web 34 concentrically surrounding the tapped barrel. Extending from section 30a inward toward the tapped barrel 32 is a conical section 30b. A second vertical section 30c extends upward away from conical section 30b parallel to the tapped barrel 32. This arrangement of the castellated nut provides a shorter moment between the slots 36 in the outer sleeve and a pin hole in a male fastener 38 onto which the nut is turned. As a result, there is less chance of pin failure.

While there have been described what are at present considered to be the preferred embodiments of this invention, it will be obvious to those skilled in the art that various changs and modifications may be made therein without departing from the invention and it is, therefore, aimed to cover all such changes and modifications as fall within the true spirit and scope of the invention.

What is claimed is:

1. A one-piece castellated nut having a tapped barrel of elliptical cross-section, an outer sleeve concentrically surrounding said tapped barrel in radially spaced relationship thereto and having a greater height than said tapped barrel so as to have a free end extending axially beyond one end of said tapped barrel, and a radially extending web joining said tapped barrel and said outer sleeve together at the other end of said nut, said outer sleeve having a polygonal cross-section with a plurality of slots disposed along diameters of said nut in the straight-line portions of said polygonal cross-section, said slots defining said castellation extending from said free end of said outer sleeve toward said web.

2. A castellated nut according to claim 1 wherein said outer sleeve has a first vertical section of polygonal cross-section extending away from said web and parallel to said tapped barrel, a conical section extending from said first vertical section inward toward said tapped barrel, and a second vertical section of polygonal cross-section extending away from said conical section and parallel to said tapped barrel.

References Cited

UNITED STATES PATENTS

| | | | |
|---|---|---|---|
| 2,393,519 | 1/1946 | Crowther | 151—5 |
| 2,393,520 | 1/1946 | Crowther. | |
| 2,394,491 | 2/1946 | Schaper. | |
| 2,758,627 | 8/1956 | Randall. | |
| 2,816,591 | 12/1957 | Reiner. | |
| 3,079,830 | 3/1963 | Faroni et al. | |

CARL W. TOMLIN, *Primary Examiner.*

R. S. BRITTS, *Assistant Examiner.*

U.S. Cl. X.R.

151—5